United States Patent [19]
Wallace

[11] 3,871,058
[45] Mar. 18, 1975

[54] ROLLED STEEL PRODUCTS AND A METHOD OF MAKING THE SAME

[76] Inventor: Henry J. Wallace, 570 Squaw Run Road, Fox Chapel Borough, Pa. 15238

[22] Filed: Oct. 5, 1973

[21] Appl. No.: 403,842

[52] U.S. Cl.................... 29/403, 29/527.7, 164/97, 164/107
[51] Int. Cl............................................ B23p 17/04
[58] Field of Search................ 29/403, 527.5, 527.7; 164/58, 59, 97, 98, 107

[56] References Cited
UNITED STATES PATENTS

| | | | |
|---|---|---|---|
| 48,973 | 7/1865 | Nimmo | 164/97 |
| 1,399,679 | 12/1921 | Wenyon | 164/97 |
| 2,855,646 | 10/1958 | Fromson | 164/76 |
| 3,247,557 | 4/1966 | Schmidt | 164/59 X |
| 3,429,361 | 2/1969 | Brooks | 164/57 |
| 3,604,494 | 9/1971 | Trager et al. | 164/97 |

Primary Examiner—C. W. Lanham
Assistant Examiner—D. C. Reiley, III
Attorney, Agent, or Firm—Martin J. Carroll

[57] ABSTRACT

A rolled steel product is made from molten steel and pieces of steel scrap of an analysis approaching that of the molten steel by feeding the scrap and molten steel into an ingot mold at the same time. Prior to feeding, the scrap is sized, cleaned and then placed in a cylinder arranged adjacent to and above the mold. The discharge end of the cylinder is closed with a gate and the scrap compressed by moving a plunger several inches to compress it in the cylinder. The scrap is then heated to remove the moisture, after which the gate is removed and the plunger moved forwardly at a steady rate to push the scrap into a chute leading to the mold. At the same time, molten steel is poured into the mold. The ingot is permitted to solidify and then heated in a soaking pit to rolling temperature after which it is rolled to semi-finished form, such as a slab, billet or bloom. The combination of heat and pressure in this operation welds or bonds the pieces of scrap to the surrounding metal and to each other, forming a unitary structure. The semi-finished form is then reheated and rolled to the desired finished hot rolled product, such as sheet, strip, rod, bar or structural shape. This second heating and hot rolling operation with its combination of heat and pressure and very substantial reduction of area supplements and completes the pressure welding process initiated in rolling the ingot to semi-finished form. The steel is then ready for fabrication or use, or for further cold rolling or cold drawing in the same manner as standard hot rolled steel mill products. The end product is a plurality of small steel scrap particles interspersed in and bonded to a mass of steel.

8 Claims, 1 Drawing Figure

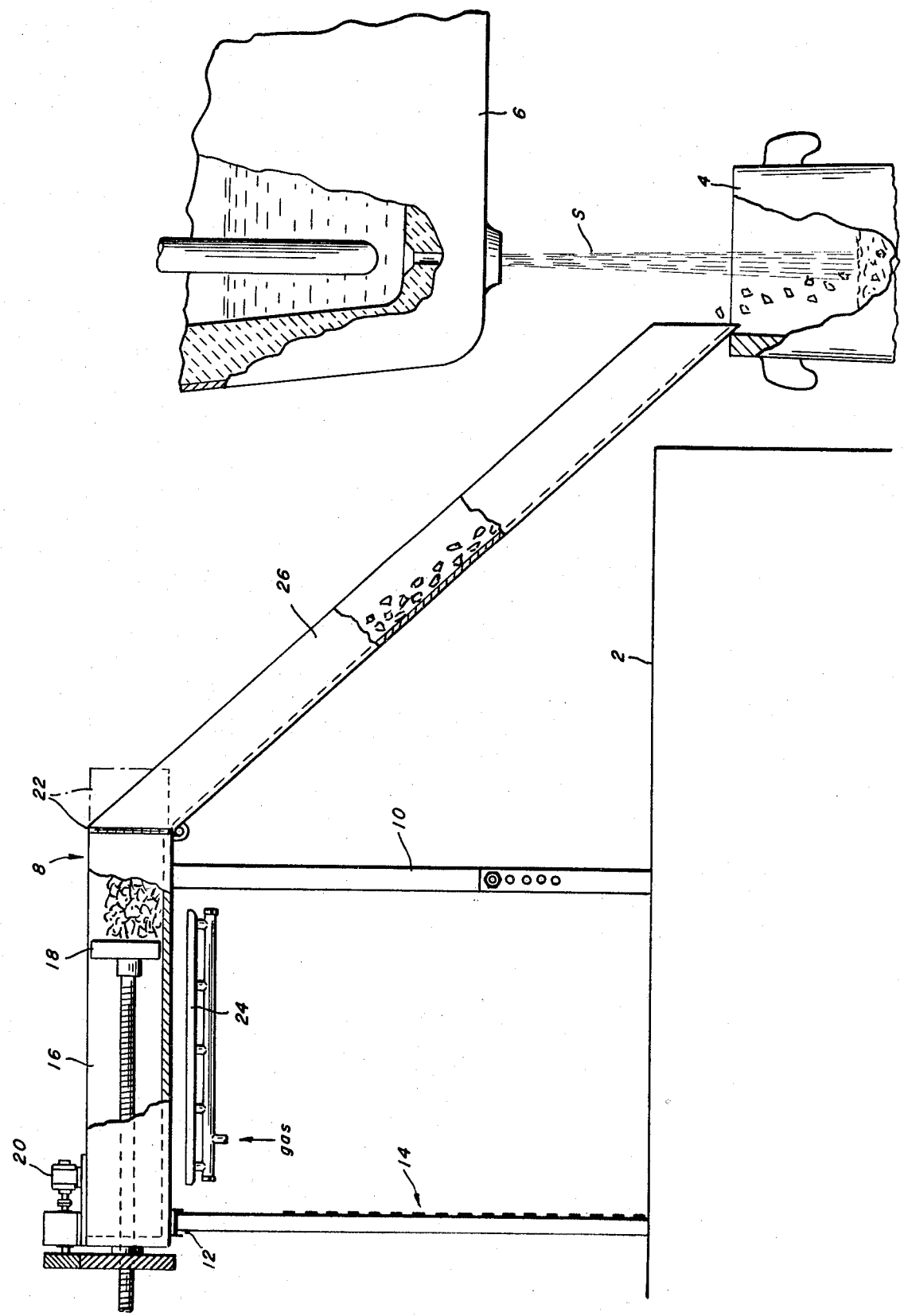

ROLLED STEEL PRODUCTS AND A METHOD OF MAKING THE SAME

This invention relates to a method of making novel metal products, an example of which is the manufacture of steel sheets from pieces of sheet steel scrap added to molten steel while being poured into an ingot mold. The rapid growth in the use of oxygen converters for making steel, replacing open hearth furnaces, has created an excess of steel scrap because the oxygen converter has definite limits on the percentage of scrap which can be used, in contrast to the open hearth furnace which has no such limits. The scrap generated in steelmaking plants and in steel users fabricating operations is an excellent source of metallics of known analysis and steel companies have for many years sought ways of best utilizing larger proportions of this scrap than are normal to the oxygen converter process. All of the methods now in common use, require complete remelting of scrap, with the attendant high cost of facilities and operations. I have found that when sheet steel scrap of known analysis is properly sized, cleaned and heated to remove the moisture therefrom, fed to an ingot mold along with molten steel of a similar analysis in an amount such that the majority thereof will not melt in the mold, and the resulting ingot processed in the usual manner to obtain sheets, the resulting steel is of such quality that it can be used for many products in the same manner as standard sheets.

In an effort to avoid the necessity of melting scrap, it has been suggested and tried to assemble pieces of scrap in various ways, then heat them to rolling temperature, and then roll on conventional rolling equipment, but these processes proved to be uneconomical and unsatisfactory.

While it is known to add solids to castings, this has been done for other reasons than to utilize scrap. The closest art of which I have knowledge are Fromson Pat. No. 2,855,646 dated Oct. 14, 1958 and Brooks Pat. No. 3,429,361 dated Feb. 25, 1969. In Fromson, shot is made from a portion of a bath of molten metal and then fed as a solid along with the remaining molten metal to a mold. The temperature and volume are controlled so that there is "a total amount of heat in the mixture which will cause at least an incipient fusion of the solid particles in the mixture." The process was developed to control temperature inside a casting while pouring the casting and is more expensive than standard casting procedure. The basic method and purpose of the Brooks Patent is similar to that of Fromson's in that it represents an approach to controlling temperature inside a continuous casting mold while pouring. The amount of heat in a normal mold of molten steel is not sufficient to melt the majority of the scrap which I add, but I have found that this is not necessary. My process does not require special temperature control or special rolling practices.

It is therefore an object of my invention to provide a method of making a rolled metal product which utilizes a substantial amount of scrap without providing the expensive facilities needed to melt the scrap.

Another object is to provide such a method which increases the production of a steel melt shop beyond its designed capacity without adding melting capacity.

A further object is to provide such a method which is more economical than the standard method of making rolled metal products.

Still another object is to provide a novel rolled steel product having unique internal characteristics.

These and other objects will become more apparent after referring to the following specification and drawing, in which:

The single FIGURE is a schematic elevation of the apparatus of my invention.

Referring more particularly to the drawing, reference numeral 2 indicates a teeming floor with a commercial size ingot mold 4 and ladle 6 positioned adjacent thereto in the usual manner. According to my invention, a scrap feeder 8 is supported above floor 2 in any suitable manner such as by means of front legs 10 and H-beam 12 of safety shield 14. The feeder 8 includes a rectangular shaped cylinder 16 open at its top and having a movable plunger 18 therein. A motor 20 moves the plunger 18 the length of the cylinder 16. The forward end of the cylinder 16 is closed by means of a pivoted gate 22. Gas burners 24 are positioned below the cylinder 16. A chute 26 is attached to the forward end of cylinder 16. In one particular installation, the chute is adjustable between 11 feet and 13 feet 10 inches, has a width of 12¼ inches and a depth of 12 inches; and the cylinder 16 has a length of 9 feet 8 inches, a width of 14¼ inches and a depth of 15 inches.

In accordance with the method of my invention, a heat of molten metal of the desired composition is selected and scrap having an analysis approaching that of the molten metal is provided. Since the invention is particularly suitable and desirable for making rolled steel products, the molten metal is preferably provided from a low carbon aluminum-killed steel heat which has a finishing bath temperature between 2,860° and 2,880°F, and a ladle temperature between 2,845° and 2,865°F. While it is preferable that the scrap analysis be the same as that of the hot metal, the invention may be practiced by using scrap of an analysis that differs somewhat from that of the hot metal as long as the scrap has similar physical properties as the steel of the heat. The scrap is cut into relatively small pieces. For example, pieces 2 × 2 × 0.024 inches thick are suitable. The scrap must be cleaned before use to remove all of the oil, grease, dirt and rust therefrom. The scrap feeder 8 is positioned as shown with the back end clamped to beam 12 and the two front legs 10 resting on the floor 2. With the plunger 18 at its back position, the cylinder 16 is filled uniformly with the desired weight of scrap. The plunger 18 is then moved forward to compress the scrap as much as possible to facilitate heating. The burners 24 are then lit and the scrap heated to remove the moisture therefrom. To insure that all the moisture is removed in a relatively short time, the scrap is preferably heated to a temperature between 400° and 500°F. With the mold 4 positioned directly in front of feeder 8, the chute 26 is attached to the forward or discharge end of cylinder 16 with its length adjusted so that the lower end will extend into the mold cavity. The ladle 6 containing the molten metal is then positioned above the mold 4 and the metal poured into the usual manner in a stream S. At the same time, gate 22 is pivoted out of operative position to the broken line position shown and the motor 20 is operated to move plunger 18 forward at a controlled rate to feed the scrap into mold 4 with the molten metal stream S. It will be seen that the scrap is directed into the falling metal stream S adjacent the top of the mold to provide best distribution of the scrap.

The percentage of scrap may vary, but it is not intended that the scrap melt. While obviously there will be some melting of the scrap, the majority thereof will not melt, but will be completely encased in the molten steel as it solidifies in the mold.

When using 24 × 37 × 85 inch molds, 1,330 pounds of scrap may be added to 14,670 pounds of molten steel so that the scrap is 8.3 percent of the total weight of the ingot or 2,600 pounds of scrap may be added so that the scrap is 16.7 percent of the total weight of the ingot. In the first instance, the scrap is added at a steady rate for a total period of 30 seconds and in the second instance, for a total period of 25 seconds. The amount of scrap added should be a minimum of 5 percent of the total weight of the ingot, but may be as high as 50 percent.

The steel is then permitted to solidify sufficiently to handle, removed from the mold, and placed in a soaking pit to heat it throughout to its rolling temperature and then rolled into slabs in the usual manner. During this rolling operation in which the cross section is reduced a minimum of 75 percent the pieces of scrap are pressure welded and bonded to each other and to the steel of the heat. The slabs are then heated and rolled into other products, such as hot rolled sheet steel, in the usual manner. The resulting steel product has surface characteristics and physical properties making it suitable for a wide range of end uses.

I have found that sheet steel scrap material having a maximum thickness of 0.25 inches, a minimum dimension of 1 inch, and a maximum dimension of 4 inches is particularly suitable. This sheet material includes hot and cold rolled sheet and strip and black plate. It is also preferred that the pieces be of substantially uniform size. If other types of scrap are used, the maximum dimension should preferably not exceed 4 inches. It appears that scrap additions of between 10 and 20 percent are most suitable. Depending upon the price and availability of scrap, percentage additions under 10 percent may not be economically justified. Percentage additions over 20 percent may require heating of the scrap to temperatures substantially above 500°F and create problems in handling and adding the scrap to the molten steel.

I have found that the rolled steel product, especially in sheet form, consists of a mass of steel having a plurality of small steel scrap pieces interspersed in and bonded thereto. Because of the scrap additions, there is random grain orientation. The physical properties of the product are comparable to those of similar conventional steel products.

While one embodiment of my invention has been shown and described, it will be apparent that other adaptations and modifications may be made without departing from the scope of the following claims.

I claim:

1. The method of making a rolled metal product which comprises providing molten metal of a known analysis in a container, providing scrap metal of an analysis approaching that of the molten metal, cleaning said scrap, heating said scrap to a temperature sufficient to remove all moisture therefrom, simultaneously charging all the scrap and molten metal by pouring said molten metal into an ingot mold while simultaneously feeding said scrap in small pieces at a controlled rate into said mold in such an amount that the majority thereof will not melt, permitting said mixture of scrap and molten metal to solidify in said mold into an ingot, heating said ingot to a rolling temperature, and then rolling said ingot to substantially reduce its cross section.

2. The method of claim 1 in which said metal is steel and said rolling reduction in cross sectional area is a minimum of 75 percent.

3. The method of claim 2 in which the added scrap is between 10 and 20 percent of the total weight of the ingot.

4. The method of claim 2 in which the maximum dimension of said scrap pieces is approximately 4 inches.

5. The method of claim 2 in which the added scrap is sheet material having a maximum thickness of 0.25 inch, a minimum dimension of 1 inch and a maximum dimension of 4 inches.

6. The method of claim 2 which includes placing said clean scrap in a cylinder, then partially compressing said scrap, then heating said scrap to remove the moisture therefrom, and then feeding said scrap from said container into said mold.

7. The method of claim 2 in which the added scrap is between 5 and 50 percent of the total weight of the ingot.

8. The method of claim 3 in which said rolling includes a first reduction to a slab and a second rolling to sheet thickness.

* * * * *